United States Patent

Tsukahara et al.

Patent Number: 5,116,547
Date of Patent: May 26, 1992

[54] METHOD OF COLORING POLYCARBONATE EXTRUDED OR MOLDED PRODUCTS FOR OPTICAL MEMBERS

[75] Inventors: Shuji Tsukahara, Yokohama; Toshikazu Umemura; Kazuyoshi Ichise, both of Osaka, all of Japan

[73] Assignees: Mitsubishi Gas Chemical Co., Tokyo; Victor Company of Japan, Ltd., Yokohama, both of Japan

[21] Appl. No.: 554,763

[22] Filed: Jul. 20, 1990

[30] Foreign Application Priority Data

Jul. 30, 1989 [JP] Japan .................. 1-197464

[51] Int. Cl.⁵ .................. B29C 45/00; B29C 47/00; B29D 11/00
[52] U.S. Cl. .................. 264/1.1; 8/497; 8/506; 8/507; 264/78; 264/211; 264/328.18
[58] Field of Search ........... 264/1.1, 78, 211, 328.18, 264/349; 8/497, 506, 507

[56] References Cited

U.S. PATENT DOCUMENTS 4,444,714  4/1984  Martenson .................. 264/328.18

FOREIGN PATENT DOCUMENTS 52-8068   1/1977  Japan .................. 264/328.18
61-272110 12/1986 Japan .................. 264/328.18

Primary Examiner—Leo B. Tentoni
Attorney, Agent, or Firm—Lowe, Price, LeBlanc & Becker

[57] ABSTRACT

A method of coloring a polycarbonate extruded or molded product for optical members, which is colored by a liquid coloring process for obtaining a colored polycarbonate extruded or molded product for optical members by extrusion or injection molding. The process involves mixing a polycarbonate resin for optical members and a liquid coloring agent dispersion obtained by dispersing a coloring agent in a dispersing agent. The dispersing agent includes a specific saturated fatty acid ester or silicon oil. After mixing the polycarbonate resin and liquid coloring agent dispersion, the resulting mixture is melted and thereafter extruded or molded to form a product for optical members.

15 Claims, 1 Drawing Sheet

METHOD OF COLORING POLYCARBONATE EXTRUDED OR MOLDED PRODUCTS FOR OPTICAL MEMBERS

BACKGROUND OF THE INVENTION

1. Field of the Invention

This invention relates to a method of coloring a polycarbonate extruded or molded product for optical members such as an optical disk, an optical card, an optical waveguide and an optical fiber. More particularly, it relates to a method of coloring a polycarbonate extruded or molded product for optical members, which is colored by a liquid coloring process for obtaining a colored polycarbonate extruded or molded product for optical members in an extruder or injection molding machine.

2. Description of the Prior Art

In recent years, various optical members are often manufactured in the form of extruded or molded products using organic polymeric materials. Such optical members include optical reproduction-only digital audio disks as exemplified by CD, CD-V and CDROM, or optical reproduction-only analog video disks as exemplified by LD, as well as other optical disks, optical cards, optical waveguides, optical fibers, and other optical members.

Incidentally, an acrylic resin (PMMA) used when substrates for optical disks are formed has the features that it facilitates the control of molecular configuration to make it hard to produce double diffraction, has good transfer properties because of its high fluidity, can decrease the residual strain of an extruded or molded product, and also has no serious problems in thermal resistance, surface hardness, mechanical properties, solvent resistance, transparency, durability, etc. It, however, has the disadvantage that two sheets must be laminated when used, because of a great warpage that may be caused by absorption of moisture. A polycarbonate resin has the features that it has a superior moisture absorption, has good mechanical properties and thermal resistance, has a superior dimensional stability, and promises a high reliability for a long period of time, but on the other hand has the problems that it tends to produce double diffraction because of its molecular structure, and must be extruded or molded at a high temperature because of its poor fluidity. As a polycarbonate resin for optical members, however, a resin has been provided whose molecular weight is decreased to improve the fluidity. It has now become usual to prepare optical cards, optical waveguides, optical fibers and other optical members by the use of such a resin.

An optical member obtained in the form of an extruded or molded product using the polycarbonate resin for optical members has been hitherto prepared in the form of a product to which no coloring agent (dye and/or pigment) is added so that the optical member can make the most of its transparency. In recent years, however, there is a demand for the advent of an optical member comprised of an extruded or molded product of a polycarbonate resin for optical members which has been colored with a coloring agent, for the purposes of improving decorativeness or imparting selectivity to wavelengths.

Referring to a method of obtaining an extruded or molded product of a colored polycarbonate resin for optical members, various conventional processes for preparing extruded or molded products of colored synthetic resins can be considered utilizable, including 1) the colored-material process in which a mixture comprised of a powdery coloring agent (dye and/or pigment) and a synthetic resin powder is melt-extruded to give pellets of synthetic resin colored with a coloring agent (dye and/or pigment), and an extruded or molded product of a synthetic resin is formed by an extruder or an injection molding machine by the use of the synthetic resin thus colored, 2) the master batch process in which an extruded or molded product of a synthetic resin is formed by an extruder or an injection molding mechine by the use of a mixture comprised of a master pellet of a synthetic resin containing a coloring agent (dye and/or pigment) in a high concentration, and a pellet of an uncolored synthetic resin, 3) the dry coloring process in which an extruded or molded product of a synthetic resin is formed by an extruder or an injection molding machine by the use of a mixture comprised of a synthetic resin pellet and a powdery coloring agent (dye and/or pigment), and 4) the liquid coloring process in which, in an extruder or an injection molding machine used for extruding or molding a synthetic resin, a synthetic resin and a liquid coloring agent dispersion obtained by dispersing a coloring agent in a dispersing agent are mixed, and thereafter the both are melted so that an extruded or molded product of a colored synthetic resin can be obtained.

Of the processes 1) to 4) having been conventionally used when extruded or molded products of colored synthetic resins are prepared, the process 1) colored-material process is a process in which colored synthetic resin pellets are used. Hence, this process requires material feed tanks that separately hold pellets of synthetic resins separately colored for each kind of required colors, and pipes that separately feed materials in a solid state from the individual material feed tanks to an extruder or an injection molding machine. This results in a large scale of equipment. In addition, the colored synthetic resin pellets are expensive and consequently extruded or molded products can not be produced at a low cost when they are produced in varieties is small quantities. The process 2) master batch process can be carried out using simple equipment, compared with the above process 1) colored-material process. Also in this process, however, extruded or molded products can not be produced at a low cost when they are produced in varieties in small quantities. The process 3) dry coloring process has the problem that dust tends to be included in the course of processing. The method 4) liquid coloring process requires no pellets of specially colored synthetic resin. It also makes it possible to feed using simple equipment a liquid coloring agent dispersion obtained by dispersing a coloring agent in a dispersing agent, to an extruder or an injection molding machine for extruding or molding synthetic resins. It further makes it easy to construct an apparatus in the manner that no dust may be included in the course of extrusion or molding. Thus, this process has no problems that are involved in the above processes 1) to 3), and can provide extruded or molded products at a low cost when they are produced in varieties in small quantities.

In the instance where a polycarbonate extruded or molded product for optical members is colored according to the above process 4) liquid coloring process, what has been conventionally used is a liquid coloring agent dispersion obtained by dispersing a coloring agent (dye and/or pigment) in a dispersing agent of a paraffin type, a dispersing agent of the type of a fatty acid ester of an oxyalkylene, or a dispersing agent of an unsaturated fatty acid ester type. Since, however, these various dispersing agents have a poor compatibility with a polycarbonate resin for optical members, this has caused the problem that no polycarbonate extruded or molded product for optical members which has good optical characteristics can be obtained because of occurrence of microscopically detectable minute changes in shape on the surface of an optical disk, and also has brought about the problem that an optical disk with a high rate of signal errors or a high rate of signal dropout is consequently manufactured particularly when substrates of optical disks such as CD, CD-V and LD are colored by the liquid coloring process.

SUMMARY OF THE INVENTION

Accordingly, an object of the present invention is to provide a method of coloring a polycarbonate extruded or molded product for optical members, that has eliminated the above problems involved in the conventional liquid color method.

The present invention provides a method of coloring a polycarbonate extruded or molded product for optical members, which is colored by a liquid coloring process for obtaining a polycarbonate extruded or molded product for optical members, colored with a coloring agent, in an extruder or injection molding machine that extrudes or molds a polycarbonate resin for optical members; said process comprising mixing a polycarbonate resin for optical members and a liquid coloring agent dispersion obtained by dispersing a coloring agent in a dispersing agent, and thereafter melting said resin and said dispersion, wherein:

said liquid coloring agent dispersion comprises a coloring agent comprising at least one of a dye and a pigment, and a dispersing agent comprising a saturated fatty acid ester comprising a full ester of a straight-chain or branched saturated monobasic fatty acid having 4 to 35 carbon atoms with a saturated monohydric or polyhydric alcohol having 2 to 35 carbon atoms; and said liquid coloring agent dispersion is used in an amount of from 0.05 to 2 parts by weight based on said polycarbonate resin for optical members.

In another embodiment of the present invention, the above liquid coloring agent dispersion alternatively comprises a coloring agent comprising at least one of a dye and a pigment, and a silicone oil, and said liquid coloring agent dispersion is used in an amount of from 0.05 to 2 parts by weight based on said polycarbonate resin for optical members.

DESCRIPTION OF THE PREFERRED EMBODIMENTS

Figure 1:
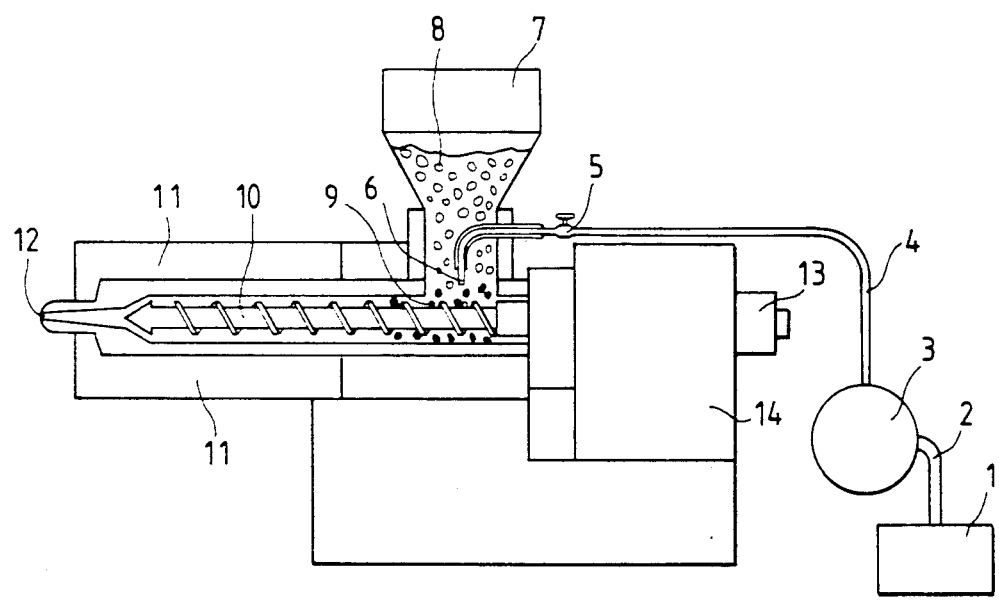
FIG. 1 is a side view to schematically illustrate an example of an apparatus used for coloring an extruded or molded product of a synthetic resin by the liquid coloring process.

Pellets of a polycarbonate resin for optical members are fed to a hopper of an extruder or injection molding machine that extrude or mold the polycarbonate resin for optical members. In the present invention, a saturated fatty acid ester comprising a full ester of a straight-chain or branched saturated monobasic fatty acid having 4 to 35 carbon atoms with a saturated monohydric or polyhydric alcohol having 2 to 35 carbon atoms is used as a dispersing agent, or, alternatively a silicone oil is used as a dispersing agent. A dye and/or a pigment used as a coloring agent is/are dispersed in a given amount based on the above saturated fatty acid ester or silicone oil used as a dispersing agent. The liquid coloring agent dispersion is thus prepared.

The liquid coloring agent dispersion thus obtained is added to the pellets of the polycarbonate resin for optical members, present at a lower part of the hopper of an extruder or an injection molding machine, by means of a pump in the state that the liquid coloring agent dispersion is fed in a rate so controlled as to be 0.05 to 2 parts by weight based on the polycarbonate resin for optical members.

The polycarbonate resin for optical members, to which the above liquid coloring agent dispersion has been added, is heated, melted and blended while it is conveyed by means of a screw conveyor, and thus a colored polycarbonate resin for optical members is obtained from a nozzle.

Specific embodiments of the method of the present invention for coloring a polycarbonate extruded or molded product for optical members will be described below in detail.

The present invention can be applied in a method of coloring a polycarbonate extruded or molded product for optical members, which is colored by a liquid coloring process for obtaining a polycarbonate extruded or molded product for optical members, colored with a coloring agent, in an extruder or injection molding machine that extrudes or molds a polycarbonate resin for optical members; said process comprising mixing a polycarbonate resin for optical members and a liquid coloring agent dispersion obtained by dispersing a coloring agent in a dispersing agent, and thereafter melting said resin and said dispersion. Here, a saturated fatty acid ester comprising a full ester of a straight-chain or branched saturated monobasic fatty acid having 4 to 35 carbon atoms with a saturated monohydric or polyhydric alcohol having 3 to 35 carbon atoms, or a silicone oil is used as the dispersing agent for dispersing the coloring agent (dry and/or pigment). The dye and/or pigment used as the coloring agent is dispersed in the saturated fatty acid ester or silicone oil used as the dispersing agent, to give the liquid coloring agent dispersion, and the resulting liquid coloring agent dispersion is used in an amount of from 0.05 to 2 parts by weight based on the polycarbonate resin for optical members, thus obtaining a polycarbonate extruded or molded product for optical members, colored by the liquid coloring process. The product thus obtained was found not to cause the problems involved in the case of a polycarbonate extruded or molded product for optical members, colored by the conventional liquid coloring process previously described. The present invention was accomplished based on this finding.

The above saturated fatty acid ester, comprising a full ester (i.e., an ester having no hydroxyl group in the molecular chain) of a straight-chain or branched saturated monobasic fatty acid having 4 to 35 carbon atoms with a saturated monohydric or polyhydric alcohol having 2 to 35 carbon atoms, used as the dispersing agent for dispersing the coloring agent (dry and/or pigment) includes, for example, esters of a saturated monobasic carboxylic acid with a monohydric alcohol, as exemplified by butyl laurate, butyl stearate, butyl behenate, stearyl stearate, behenyl behenate, and myricyl stearate, and full esters of a saturated monobasic carboxylic acid with a saturated polyhydric alcohol, as exemplified by ethylene glycol distearate, glycerol tristearate, trimethylolpropane tristearate, and pentaerythritol tetrastearate.

In view of the construction of an apparatus and also in view of the handling and operation, it is advatageous to use as the above saturated fatty acid ester those having a melting point of from −30° C. to +80° C. This is a preferred embodiment.

As the silicone oil used in the present invention as the dispersing agent for dispersing the coloring agent (dry and/or pigment) it is preferred to use, for example, dimethylpolysiloxane and/or methylphenylpolysiloxane. A silicone oil having a viscosity of from 100 cp to 10,000 cp can be used.

The saturated fatty acid ester or silicone oil, previously described, can also well function as a release agent, and hence shows good release properties when the liquid coloring agent dispersion of the present invention is directly fed to a screw conveyor section of an injection molding machine so as to be added to pellets of the polycarbonate resin for optical members, and the resulting pellets are blended, melted and thereafter injection molded. Thus, the mold may not be contaminated, and can be readily kept in a good state.

A compound having a hydroxyl group in its molecular chain, such as glycerol monostearate, trimethylolpropane monostearate or pentaerythritol distearate, which are commonly used as a release agent for a polycarbonate resin, may lower the thermal resistance of the polycarbonate resin, and therefore it is not preferred to add the compound in an amount of not less than 0.1 part by weight based on the polycarbonate resin. Hence, it is not preferred to use such a compound as the dispersing agent for the liquid coloring agent dispersion.

The saturated fatty acid ester or silicone oil used as the dispersing agent when the liquid coloring agent dispersion of the present invention is prepared as described above should be those exhibiting a liquid state at room temperature or a temperature around room temperature from the viewpoint of the readiness in use.

The silicone oil in itself exhibits a liquid state at room temperature or a temperature around room temperature, and hence has no problem in this respect. When, however, the above saturated fatty acid ester is used as the dispersing agent, preferably used as butyl stearate, butyl stearate, stearyl stearate, etc., which exhibit a liquid state at room temperature or a temperature around room temperature.

Among the above saturated fatty acid esters, it is of course possible to use those curable at room temperature. In such an instance, however, it is necessary to heat the saturated fatty acid ester curable at room temperature, to a temperature higher than its melting point and maintain the liquid state. Hence, a saturated fatty acid ester having a melting point of 80° C. or higher necessarily requires an expensive apparatus because of its necessity of strict control of the temperature for dissolution or for the heating of a liquid-transport system. In addition, a saturated fatty acid ester that has stagnated tends to cause a change of properties as a result of the decomposition thereof. Thus, it can not be said to be a preferred embodiment that the saturated fatty acid ester having a melting point of 80° C. or higher is used as the dispersing agent.

Referring to the coloring agent to be dispersed in the above saturated fatty acid ester or silicone oil used as the dispersing agent in the method of the present invention, the coloring agent may preferably include those having a good thermal resistance or dispersibility and also capable of being hardly adhered to a mold, and it is possible for use, for example, a coloring agent of a methane type, an anthraquinone type, a perylene type, a thioindigo type, phthalocyanine type, a cumarine type, a bisbenzoxazylphthalene type or an oxazole stilbene type.

When the coloring agent is dispersed using the saturated fatty acid ester or silicone oil as a dispersing agent as described above to obtain the liquid coloring agent dispersion of the present invention, the coloring agent is used in a concentration so selected as to be from 0.5% by weight to 10% by weight based on the dispersing agent, in order to improve the dispersibility of the coloring agent in the dispersing agent. The coloring agent is also used in a concentration so selected that the liquid coloring agent dispersion is in an amount of from 0.05% by weight to 2% by weight based on the polycarbonate resin for optical members.

Use of the liquid coloring agent dispersion in an amount less than 0.05% by weight based on the polycarbonate resin for optical members may cause a problem in the feeding accuracy of the liquid coloring agent dispersion. On the other hand, use of the liquid coloring agent dispersion in an amount more than 2% by weight based on the polycarbonate resin for optical members may cause the problem that the liquid coloring agent dispersion bleeds to the surface of a molded product to contaminate a mold.

The liquid coloring agent dispersion may most preferably be added in an amount ranging from 0.2% by weight to 1% by weight based on the polycarbonate resin for optical members.

The polycarbonate resin for optical members which is colored by the liquid coloring process, using the liquid coloring agent dispersion obtained in the manner as described above includes, for example, aromatic or aliphatic polycarbonate resins as typified by a polycarbonate resin obtained using 2,2′-bis(4-hydroxyphenyl)-propane as a starting material. It may also include a polycarbonate resin obtained by grafting styrene or a copolymer of styrene with other unsaturated hydrocarbon on a polycarbonate resin.

An example of preparation of the polycarbonate extruded or molded product for optical members, colored by the liquid coloring process carried out according to the coloring method of the present invention will be described below with reference to the accompanying drawing.

In the working of the method of present invention, an apparatus, for example, as shown in FIG. 1 can be used.

FIG. 1 schematically illustrates an example of an apparatus used for coloring an extruded product of a synthetic resin by the liquid coloring process, where an extruded product of a synthetic resin is colored by feeding to an extruder the liquid coloring agent dispersion of the present invention.

In FIG. 1, the numeral 1 denotes a container for a liquid coloring agent dispersion, which holds therein the liquid coloring agent dispersion of the present invention obtained by dispersion the above coloring agent in the above dispersing agent. The numerals 2, 4, and 6, pipes; 3, a pump; and 5, a valve, through these of which the liquid coloring agent dispersion is fed in the extruder.

The numeral 7 denotes a hopper from which the starting material synthetic resin pellets 8 are fed to the extruder. Black dots shown in the drawing by the reference numeral 9 denote the starting material synthetic resin pellets 9 (originally 8) to which the liquid coloring agent dispersion has been adhered.

The numeral 10 denotes a screw conveyor, and a heating zone 11 is provided at part of the periphery of the screw conveyor.

The above screw conveyor is so constituted as to be rotated by the driving of a motor 13 through a drive mechanism 14. The numeral 12 denotes a nozzle from which the colored polycarbonate resin for optical members is extruded.

The pellets 8 (or powder) of the polycarbonate resin for optical members are fed to the hopper 7 of the extruder, and also the the liquid coloring agent dispersion obtained in the manner as previously described is put in the container 1 for the liquid coloring agent dispersion.

Next, the valve 5 is opened, and the pump 3 (as exemplified by a tube pump, a plunger pump, and a gear pump) is actuated, so that the liquid coloring agent dispersion in the container 1 is passed through the path constituted of the pipe 2, the pump 3, and the pipe 4, the valve 5 and the pipe 6, by means of the pump 3 and then fed from a nozzle at the tip of the pipe 6 to the inside of the extruder (or an injection molding machine). The feed of the liquid coloring agent dispersion fed from the nozzle at the tip of the pipe 6 to the inside of the extruder (or an injection molding machine) as described above and the feed of the polycarbonate resin for optical members, fed from the hopper to the inside of the extruder (or an injection molding machine), are controlled by a control mechanism (not shown) in the manner that the liquid coloring agent dispersion can be added in an amount of from 0.05 to 2 parts by weight based on the feed of the polycarbonate resin for optical members, and thus added to the pellets (or powder) of the polycarbonate resin for optical members, present at a lower part of the hopper of the extruder (or an injection molding machine) by means of the pump 3.

The pellets (or powder) 8 of the polycarbonate resin for optical members, present at a lower part of the hopper, is mixed at that part with the liquid coloring agent dispersion fed from the nozzle at the tip of the pipe 6, and then the mixture is conveyed by the screw conveyor 10. At part of the periphery of the screw conveyor 10, the heating zone 11 is provided, and the pellets (or powder) 9, i.e., the pellets (or powder) to which the liquid coloring agent dispersion has been adhered, of the polycarbonate resin for optical members, conveyed by the screw conveyor are heat-melted at the heating zone 11.

The screw conveyor 10 is rotated by the driving of a motor 13 through the drive mechanism 14 and at the same time driven with positional changes at given timing and in the right and left directions as viewed in the drawing, and thus the molten resin is extruded from the nozzle 12.

The polycarbonate resin for optical members, extruded from the nozzle 12, is in the state that it has been colored with the coloring agent, and the extruded, colored polycarbonate resin for optical members is extruded (or molded) using a nozzle with a given nozzle shape (or using a mold) so that the desired extruded (or molded) product can be obtained according to a known extrusion (or molding) technique. For example, it is readily possible to extrude a colored polycarbonate resin sheet or optical fiber for optical members, using the extruder. It is also readily possible to manufacture a colored optical disk substrate.

In the above description, the liquid coloring agent dispersion fed from the nozzle at the tip of the pipe 6 is added to the pellets (or powder) of the polycarbonate resin for optical members at a lower part of the hopper 7. Alternatively, the liquid coloring agent dispersion may be added to the polycarbonate resin for optical members at the end zone of the screw conveyor 10. In such an instance, the liquid coloring agent dispersion is fed to the end zone filled with the polycarbonate resin for optical members, and hence it is necessary to feed the liquid coloring agent dispersion by the use of a high-pressure pump.

In the instance where the liquid coloring agent dispersion is added to the polycarbonate resin for optical members at the end zone of the screw conveyor 10 as in the above, it is possible to obtain the advantage that superior color variation properties can be achieved, compared with the case when the liquid coloring agent dispersion is added to the pellets (or powder) of the polycarbonate resin for optical members at a lower part of the hopper 7.

The liquid coloring agent dispersion can be readily added to the pellets (or powder) of the polycarbonate resin for optical members or to a molten polycarbonate resin for optical members after it has been passed through a micro-filtration membrane, and hence dust can be well prevented from being included in the extruded or molded product.

It is also very readily possible to construct the whole system as a closed system, and hence the dust control can be carried out with ease, compared with the instances where the extruded or molded product is colored by the dry coloring process or master batch process previously described.

Comparative data of noise are shown below which were obtained by comparing a compact disk (CD) prepared using the polycarbonate resin for optical members, produced according to the method of the present invention, and an optical video disk prepared by feeding the polycarbonate resin for optical members to an injection molding machine according to the method of the present invention, with a colored compact disk and a colored optical video disk, respectively, prepared according to a conventional method.

DATA ON COMPACT DISKS (CD)

1. A compact disk (CD) prepared using a polycarbonate resin sheet for optical members, produced according to the coloring method of the present invention:

(A) Polycarbonate resin for optical members: A polycarbonate resin for optical members, H4000, a product of Mitsubishi Gas Chemical Company, Inc.

(B) Liquid coloring agent dispersion:

Dispersing agent: Butyl stearate (in the amount that may give a concentration of 0.5% in the polycarbonate resin for optical members).

Dye: A perylene dye (in the amount that may give a concentration of 50 ppm in a sheet of CD)

(C) Extruder used for preparing a colored polycarbonate resin sheet for optical members: A monoaxial vented extruder of 65 in diameter and 32 in L/D.

Using the above materials and extruder, a colored polycarbonate resin sheet for optical members, of 1.2 mm in thickness and 400 mm in width was prepared. This colored polycarbonate resin sheet for optical members, a PVC sheet (film) on which pits have been formed by signals formed according to a CD digital audio data format, and a reflector film made of aluminum were laminated, and then cut into a compact disk (CD) of 120 mm in diameter.

(D) As to the noise level in the above compact disk, C1 was 0.3 to 0.5%.

(The C1 refers to one of code error quantities that indicate noise levels in the CD standard, and is a code error before an error is corrected by the first error correcting device in a reproducing system. When error detection is carried out for each frame unit with respect to the data of 7,350 frames per second, 7,350 errors are regarded as 100% and the C1 represents the number of errors expressed in percentage.)

2. A compact disk (CD) prepared using a polycarbonate resin sheet for optical members, produced according to the conventional coloring method:

(A) Polycarbonate resin for optical members: A polycarbonate resin for optical members, H4000, a product of Mitsubishi Gas Chemical Company, Inc.

(B) Liquid coloring agent dispersion:

Dispersing agent: Linseed oil (in the amount that may give a concentration of 0.5% in the polycarbonate resin for optical members).

Dye: A perylene dye (in the amount that may give a concentration of 50 ppm in a sheet of CD)

(C) Extruder used for preparing a colored polycarbonate resin sheet for optical members: A monoaxial vented extruder of 65 in diameter and 32 in L/D.

Using the above materials and extruder, a colored polycarbonate resin sheet for optical members, of 1.2 mm in thickness and 400 mm in width was prepared. This colored polycarbonate resin sheet for optical members, a PVC sheet (film) on which pits have been formed by signals formed according to a CD digital audio data format, and a reflector film made of aluminum were laminated, and then cut into a compact disk (CD) of 120 mm in diameter.

(D) As to the noise level in the above compact disk, C1 was 1 to 3%.

As shown in the above, from the comparison of noise between 1. the compact disk (CD) prepared using a polycarbonate resin sheet for optical members, produced according to the coloring method of the present invention, and 2. the compact disk (CD) prepared using a polycarbonate resin sheet for optical members, produced according to a conventional coloring method, the compact disk (CD) prepared according to the method of the present invention is seen to have a much smaller noise level than the compact disk (CD) prepared according to the conventional method.

DATA ON OPTICAL VIDEO DISKS

1. An optical video disk (OVD) prepared by feeding the polycarbonate resin for optical members to an injection molding machine according to the coloring method of the present invention:

(A) Polycarbonate resin for optical members: A polycarbonate resin for optical members, H4000, a product of Mitsubishi Gas Chemical Company, Inc.

(B) Liquid coloring agent dispersion:

Dispersing agent (b1): Dimethylpolysiloxane with a viscosity of 500 cp (in the amount that may give a concentration of 0.3% in the polycarbonate resin for optical members).

Dispersing agent (b2): Dimethylpolysiloxane with a viscosity of 1,000 cp (in the amount that may give a concentration of 0.3% in the polycarbonate resin for optical members).

Dispersing agent (b3): Methylphenylpolysiloxane with a viscosity of 250 cp (in the amount that may give a concentration of 0.5% in the polycarbonate resin for optical members).

Dye: A perylene dye (in the amount that may give a concentration of 50 ppm in a sheet of OVD)

(C) An OVD was prepared using an injection molding machine.

(D) As to the noise level in the above optical video disk, the number of dropout of signals in 10 seconds was 45.

2. An optical video disk (OVD) prepared using a polycarbonate resin sheet for optical members, produced according to a conventional method of coloring a polycarbonate extruded or molded product for optical members.

(A) Polycarbonate resin for optical members: A polycarbonate resin for optical members, H4000, a product of Mitsubishi Gas Chemical Company, Inc.

(B) Liquid coloring agent dispersion:

Dispersing agent (b1): PE wax with an average molecular weight of 1,500 (in the amount that may give a concentration of 0.5% in the polycarbonate resin for optical members).

Dispersing agent (b2): Paraffin wax with a viscosity of 500 cp (in the amount that may give a concentration of 0.5% in the polycarbonate resin for optical members).

Dispersing agent (b3): An ester of an oxyalkylene (in the amount that may give a concentration of 0.5% in the polycarbonate resin for optical members).

Dye: A perylene dye (in the amount that may give a concentration of 50 ppm in a sheet of OVD)

(C) An OVD was prepared using an injection molding machine.

(D) As to the noise level in the above optical video disk, the number of dropout of signals in 10 seconds was 65.

As shown in the above, from the comparison of noise level between the optical video disk shown in paragraph (1), prepared by injection molding of the polycarbonate resin for optical members according to the coloring method of the present invention and the optical video disk shown in paragraph (2), prepared by injection molding of the polycarbonate resin for optical members according to a conventional coloring method, the optical video disk prepared according to the method of the present invention is seen to have a much smaller number of signal dropouts than the optical video disk prepared according to the conventional method.

In the above optical video disk shown in paragraph (1), prepared according to the method of the present invention, the number 45, of signal dropouts occurring in the reproducing time of 10 seconds was the same as the number of signal dropouts occurring in the reproducing time of 10 seconds in an optical video disk which has been colored according to the colored-material process previously discussed.

What is claimed is:

1. A method of coloring a polycarbonate extruded or molded product for optical members, which is colored by a liquid coloring process for obtaining a polycarbonate extruded or molded product for optical members, colored with a coloring agent, in an extruder or injection molding machine that extrudes or molds a polycarbonate resin for optical members; said process comprising mixing a polycarbonate resin for optical members and a liquid coloring agent dispersion obtained by dispersing a coloring agent in a dispersing agent, thereafter melting said resin and said dispersion, and subsequently forming a colored extruded or molded product for optical members wherein:

said liquid coloring agent dispersion comprises a coloring agent comprising at least one of a dye and a pigment, and a dispersing agent comprising a saturated fatty acid ester comprising a full ester of a straight-chain or branched saturated monobasic fatty acid having 4 to 35 carbon atoms with a saturated monohydric or polyhydric alcohol having 2 to 35 carbon atoms; and said liquid coloring agent dispersion is used in an amount of from 0.05 to 2 parts by weight based on said polycarbonate resin for optical members.

2. A method of coloring a polycarbonate extruded or molded product for optical members according to claim 1, wherein said saturated fatty acid ester is an ester of a saturated monobasic carboxylic acid with a monohydric alcohol.

3. A method of coloring a polycarbonate extruded or molded product for optical members according to claim 2, wherein said saturated fatty acid ester is selected from the group consisting of butyl laurate, butyl sterate, butyl behenate, stearyl stearate, behenyl behenate, and myricyl stearate.

4. A method of coloring a polycarbonate extruded or molded product for optical members according to claim 1, wherein said saturated fatty acid ester is an ester of a saturated monobasic carboxylic acid with a saturated polyhydric alcohol.

5. A method of coloring a polycarbonate extruded or molded product for optical members according to claim 4, wherein said saturated fatty acid ester is selected from the group consisting of ethylene glycol distearate, glycerol tristearate, trimethylolpropane tristearate, and pentaerythritol tetrastearate.

6. A method of coloring a polycarbonate extruded or molded product for optical members according to claim 1, wherein said saturated fatty acid ester has a melting point of from $-30°$ C. to $+80°$ C.

7. A method of coloring a polycarbonate extruded or molded product for optical members according to claim 1, wherein said liquid coloring agent dispersion is used in an amount of from 0.2 to 1 part by weight based on said polycarbonate resin for optical members.

8. A method of coloring a polycarbonate extruded or molded product for optical members according to claim 1, wherein said coloring agent is used in a concentration of from 0.5% by weight to 10% by weight based on the dispersing agent.

9. A method of coloring a polycarbonate extruded or molded product for optical members according to claim 1, wherein said coloring agent comprises a dye or pigment of a methane type, an anthraquinone type, a perylene type, a thioindigo type, a phthalocyanine type, a cumarine type, a bisbenzoxazylnaphthalene type or an oxazole stilbene type.

10. A method of coloring a polycarbonate extruded or molded product for optical members according to claim 1, wherein said liquid coloring agent dispersion comprises a coloring agent comprising at least one of a dye and a pigment, and a dispersing agent comprising a silicone oil; and said liquid coloring agent dispersion is used in an amount of from 0.05 to 2 parts by weight based on said polycarbonate resin for optical members.

11. A method of coloring a polycarbonate extruded or molded product for optical members according to claim 10, wherein said silicone oil is at least one of dimethylpolysiloxane and methylphenylpolysiloxane.

12. A method of coloring a polycarbonate extruded or molded product for optical members according to claim 10, wherein said silicone oil has a viscosity of from 100 cp to 10,000.

13. A method of coloring a polycarbonate extruded or molded product for optical members according to claim 10, wherein said liquid coloring agent dispersion is used in an amount of from 0.2 to 1 part by weight based on said polycarbonate resin for optical members.

14. A method of coloring a polycarbonate extruded or molded product for optical members according to claim 10, wherein said coloring agent is used in a concentration of from 0.5% by weight to 10% by weight based on the dispersing agent.

15. A method of coloring a polycarbonate extruded or molded product for optical members according to claim 10, wherein said coloring agent comprises a dye or pigment of a methane type, an anthraquinone type, a perylene type, a thioindigo type, a phthalocyanine type, a cumarine type, a bisbenzoxazylnaphthalene type or an oxazole stilbene type.

* * * * *

UNITED STATES PATENT AND TRADEMARK OFFICE
CERTIFICATE OF CORRECTION

PATENT NO. : 5,116,547
DATED : May 26, 1992
INVENTOR(S) : Shuji Tsukahara et al

It is certified that error appears in the above-identified patent and that said Letters Patent is hereby corrected as shown below:

On title page, item [73] "Mitsubishi Gas

Chemical Co." should be -- Mitsubishi Gas Chemical Company, Inc.--

Signed and Sealed this

Twelfth Day of April, 1994

Attest:

BRUCE LEHMAN

*Attesting Officer*    *Commissioner of Patents and Trademarks*